(12) United States Patent
Takemoto et al.

(10) Patent No.: US 11,511,607 B2
(45) Date of Patent: Nov. 29, 2022

(54) OPENING-CLOSING BODY CONTROL DEVICE FOR VEHICLE

(71) Applicant: AISIN CORPORATION, Kariya (JP)

(72) Inventors: Atsushi Takemoto, Kariya (JP); Takashi Kikuta, Kariya (JP); Xueqing Ding, Kariya (JP)

(73) Assignee: Aisin Corporation, Aichi (JP)

( * ) Notice: Subject to any disclaimer, the term of this patent is extended or adjusted under 35 U.S.C. 154(b) by 43 days.

(21) Appl. No.: 17/147,580

(22) Filed: Jan. 13, 2021

(65) Prior Publication Data
US 2021/0229535 A1    Jul. 29, 2021

(30) Foreign Application Priority Data

Jan. 23, 2020    (JP) .............................. JP2020-009184

(51) Int. Cl.
| | |
|---|---|
| B60J 7/057 | (2006.01) |
| B60L 1/00 | (2006.01) |
| B60L 7/10 | (2006.01) |
| E05F 15/00 | (2015.01) |
| H02P 3/14 | (2006.01) |
| E05F 15/659 | (2015.01) |

(52) U.S. Cl.
CPC ............. B60J 7/0573 (2013.01); B60L 1/003 (2013.01); B60L 7/10 (2013.01); *E05F 15/00* (2013.01); *E05F 15/659* (2015.01); *E05Y 2400/20* (2013.01); *E05Y 2900/542* (2013.01); *H02P 3/14* (2013.01)

(58) Field of Classification Search
CPC ..... B60J 7/00; B60J 7/043; B60J 7/057; B60J 7/0573; B60L 1/00; B60L 1/003; B60L 1/20; B60L 7/10; B60L 7/18; B60L 7/24; E05F 15/00; E05F 15/60; E05F 15/603; E05F 15/655; E05F 15/659; B60W 20/14; H02P 3/12; H02P 3/14; E05Y 2400/10; E05Y 2400/20; E05Y 2400/302; E05Y 2900/542
USPC ....................... 296/155, 216.01, 216.04, 223
See application file for complete search history.

(56) References Cited

U.S. PATENT DOCUMENTS

| | | | |
|---|---|---|---|
| 2013/0024076 A1* | 1/2013 | Fukui .................... | E05F 15/622 701/49 |
| 2015/0025732 A1 | 1/2015 | Min et al. | |

(Continued)

FOREIGN PATENT DOCUMENTS

| | | |
|---|---|---|
| JP | 2002-103979 A | 4/2002 |
| JP | 2004-129454 A | 4/2004 |

*Primary Examiner* — Dennis H Pedder
*Assistant Examiner* — Joyce Eileen Hill
(74) *Attorney, Agent, or Firm* — Finnegan, Henderson, Farabow, Garrett & Dunner, LLP

(57) ABSTRACT

An opening-closing body control device for a vehicle includes: an opening-closing control unit configured to control an operation of an opening-closing body provided in an opening portion of a vehicle by controlling energization of a motor serving as a drive source. When the opening-closing body being moved based on a driving force of the motor is to be stopped, the opening-closing control unit sets a free running period during which free rotation of the motor is allowed, and executes brake control for generating a braking force in the motor after the free running period elapses.

8 Claims, 6 Drawing Sheets

(56) References Cited

U.S. PATENT DOCUMENTS

2018/0183361 A1\* 6/2018 Kadoya ..................... H02P 3/12
2018/0272845 A1\* 9/2018 Takenaka .................. B60J 5/06

\* cited by examiner

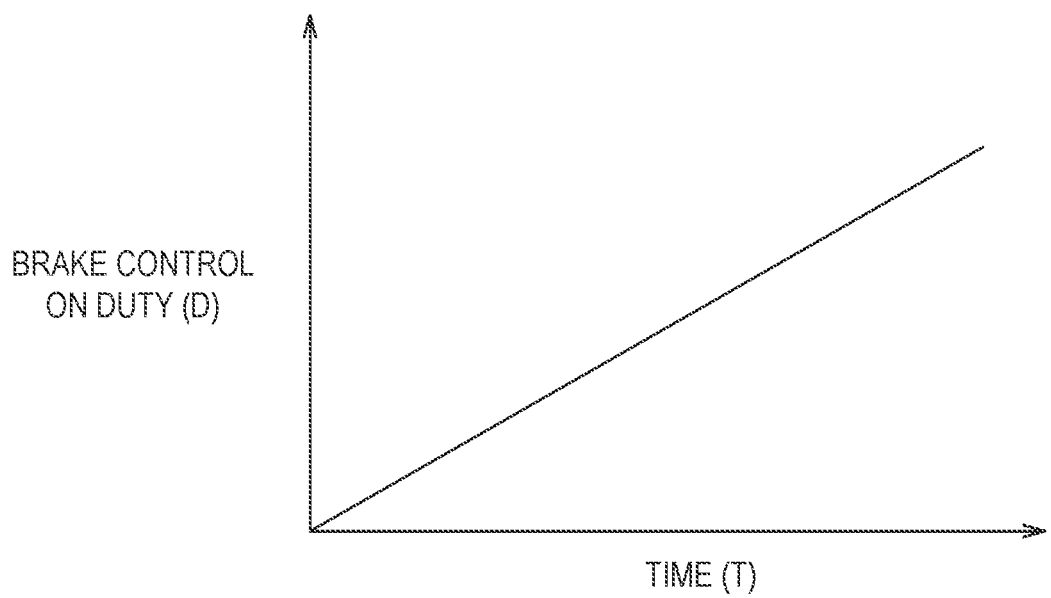

OPENING-CLOSING BODY CONTROL DEVICE FOR VEHICLE

CROSS REFERENCE TO RELATED APPLICATIONS

This application is based on and claims priority under 35 U.S.C. § 119 to Japanese Patent Application 2020-009184, filed on Jan. 23, 2020, the entire content of which is incorporated herein by reference.

TECHNICAL FIELD

This disclosure relates to an opening-closing body control device for a vehicle.

BACKGROUND DISCUSSION

In the related art, for example, as disclosed in JP 2002-103979A (Reference 1), there is an opening-closing body control device for a vehicle that controls an operation of an opening-closing body provided in an opening portion of a vehicle, such as a movable panel of a sunroof device, by controlling energization of a motor serving as a drive source. Further, for example, JP 2004-129454A (Reference 2) discloses a configuration in which a braking force is generated in a motor due to execution of regenerative brake control. Further, references of the related art disclose a configuration in which a gate voltage of a switching element to be turned on is gradually increased at the time of execution of regenerative brake control. Accordingly, by gradually increasing the braking force generated in the motor, it is possible to prevent generation of vibration and sound due to inertia.

However, in a vehicle, further improvement is in progress for all components. Further, the opening-closing body control device for a vehicle as described above also does not necessarily satisfy a required level according to the configuration of the related art described above, so that there is still room for improvement in this respect.

A need thus exists for an opening-closing body control device for a vehicle which is not susceptible to the drawback mentioned above.

SUMMARY

An opening-closing body control device for a vehicle according to an aspect of this disclosure includes: an opening-closing control unit configured to control an operation of an opening-closing body provided in an opening portion of a vehicle by controlling energization of a motor serving as a drive source. When the opening-closing body being moved based on a driving force of the motor is to be stopped, the opening-closing control unit sets a free running period during which free rotation of the motor is allowed, and executes brake control for generating a braking force in the motor after the free running period elapses.

BRIEF DESCRIPTION OF THE DRAWINGS

The foregoing and additional features and characteristics of this disclosure will become more apparent from the following detailed description considered with the reference to the accompanying drawings, wherein:

FIG. 7 is an explanatory diagram showing brake control of another example.

DETAILED DESCRIPTION

Hereinafter, an embodiment disclosed here in which an opening-closing body control device for a vehicle is embodied as a sunroof device of a vehicle will be described with reference to the drawings.

Figure 1:
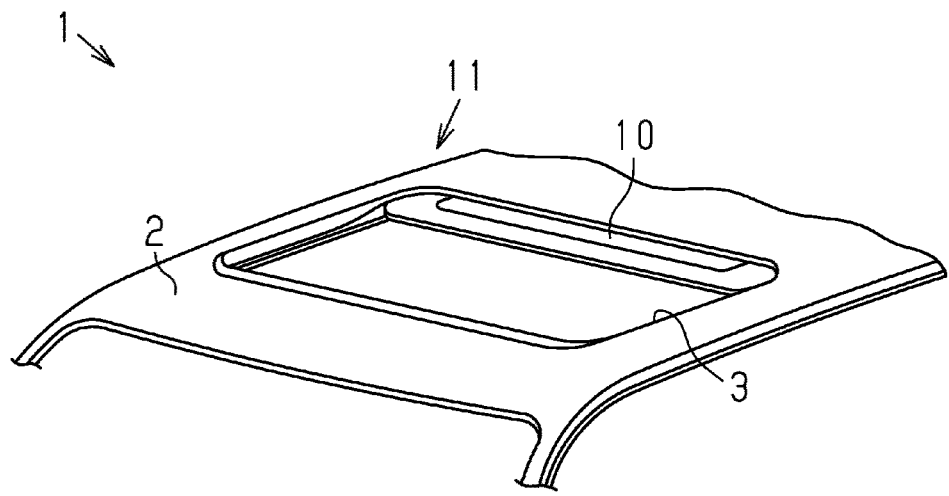
FIG. 1 is a perspective view showing a vehicle including a sunroof device.
Figure 2:
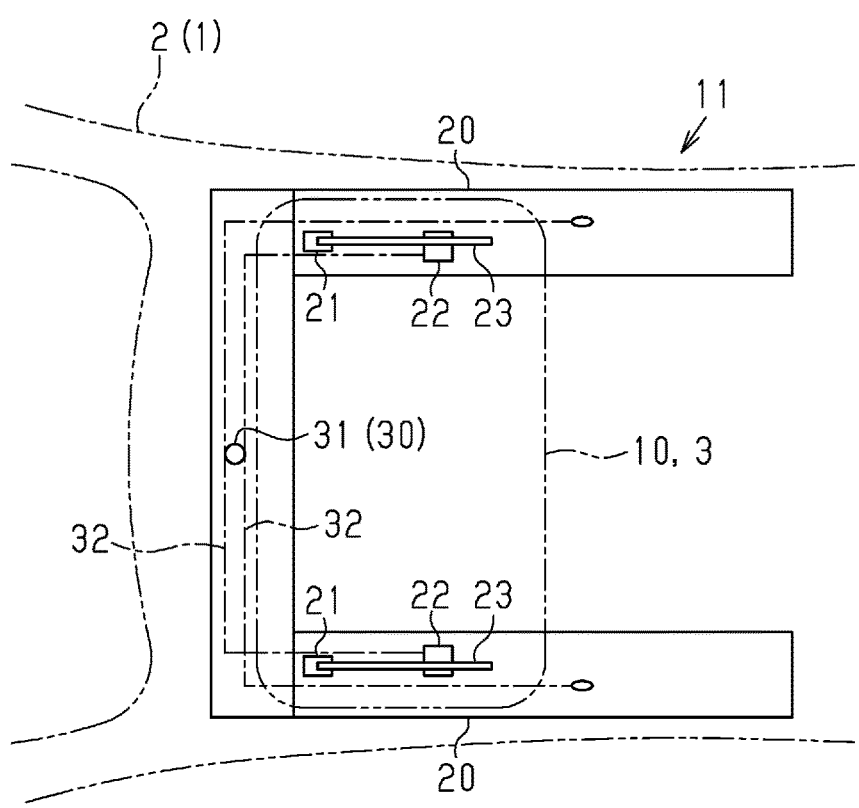
FIG. 2 is a schematic configuration diagram showing the sunroof device.

As shown in FIGS. 1 and 2, a roof opening portion 3 formed in a roof panel 2 of a vehicle 1 is provided with a substantially flat plate-shaped movable panel 10 that can open and close the roof opening portion 3. The vehicle 1 according to the present embodiment includes a sunroof device 11 that opens and closes the movable panel 10 by being driven by a motor.

Specifically, as shown in FIG. 2, the sunroof device 11 according to the present embodiment includes a pair of left and right guide rails 20, 20 extending in a vehicle front-rear direction at both end sides of the roof opening portion 3 in a width direction. The sunroof device 11 includes a pair of left and right front shoes 21, 21 and a pair of left and right rear shoes 22, 22 that slide along an extending direction thereof in a state of being engaged with the guide rails 20, 20. The sunroof device 11 according to the present embodiment includes a pair of left and right support brackets 23, 23 that upwardly support the movable panel 10 in a state of being connected to the front shoes 21, 21 and the rear shoes 22, 22.

In addition, the sunroof device 11 according to the present embodiment includes an actuator 31 that uses a motor 30 as a drive source. In the sunroof device 11 according to the present embodiment, the actuator 31 is fixed to an inside of the roof opening portion 3 at a vehicle front position of the roof panel 2. Further, the sun roof device 11 according to the present embodiment includes a pair of left and right drive cables 32, 32 routed along the left and right guide rails 20, 20. These drive cables 32, 32 are connected to the rear shoes 22, 22 engaged with the left and right guide rails 20, 20, respectively.

That is, in the sunroof device 11 according to the present embodiment, the rear shoes 22, 22 connected to the actuator 31 via the drive cables 32, 32 slide in the vehicle front-rear direction based on a driving force generated in the motor 30. Further, the front shoes 21, 21 slide in the vehicle front-rear direction in conjunction with the rear shoes 22, 22. As a result, the sunroof device 11 according to the present embodiment is configured such that the movable panel 10 supported on the support brackets 23, 23 operates, specifically, perform a tilt opening-closing operation and a slide opening-closing operation.

Figure 3:
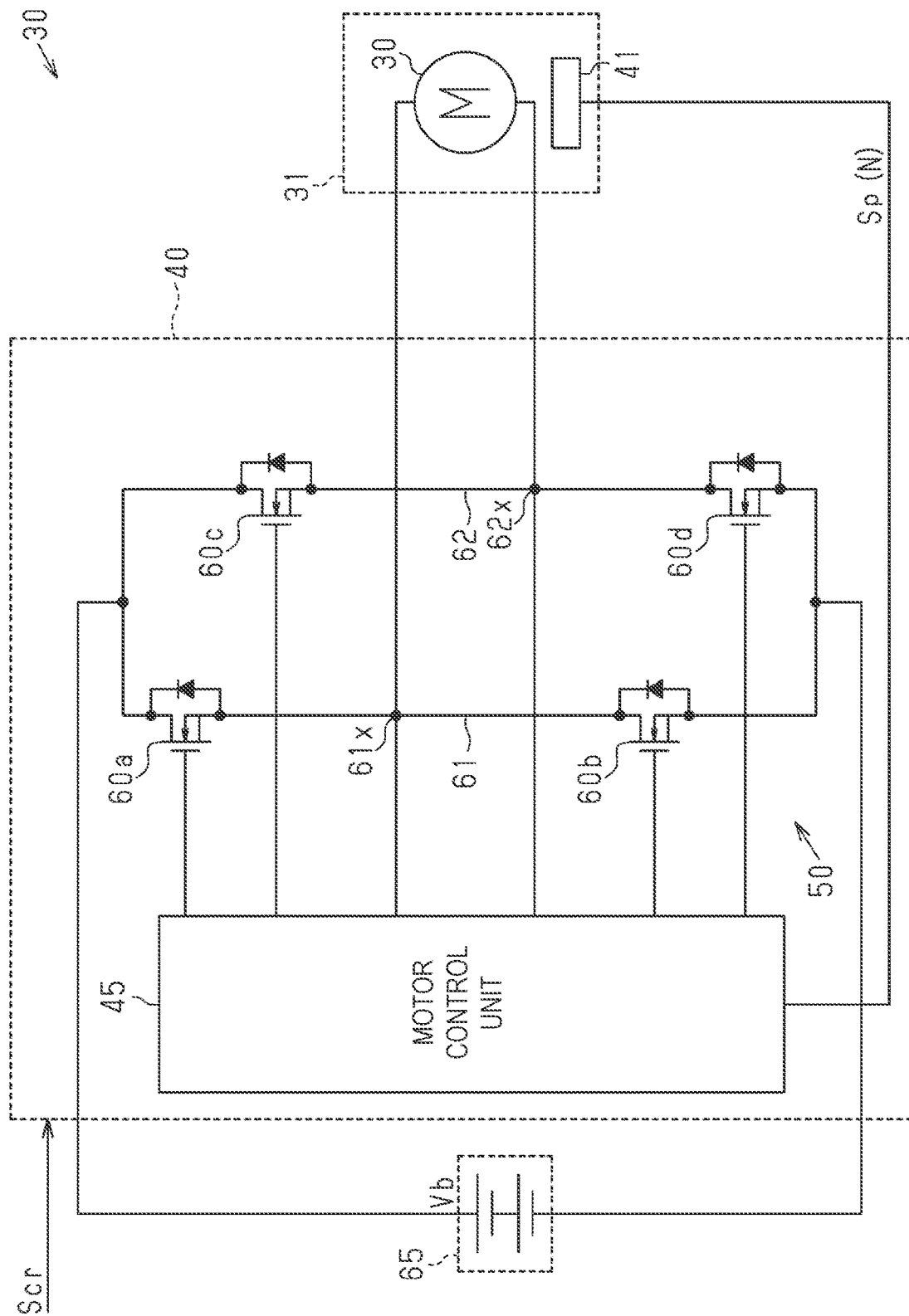
FIG. 3 is a block diagram showing the sunroof device.

Specifically, as shown in FIG. 3, the sunroof device 11 according to the present embodiment includes an ECU 40 that controls energization of the motor 30 serving as the drive source of the actuator 31. That is, the motor 30 according to the present embodiment is rotated by receiving supply of driving electric power from the ECU 40. Thus, the sunroof device 11 according to the present embodiment is configured to control the operation of the movable panel 10.

Specifically, the actuator 31 according to the present embodiment is provided with a pulse sensor 41 that outputs a pulse signal Sp synchronized with rotation of the motor 30. The ECU 40 according to the present embodiment detects, based on a pulse output of the pulse sensor 41, a position and a speed of the movable panel 10 driven by the actuator 31.

An operation input signal Scr indicating an operation request of the movable panel 10 is input to the ECU 40 according to the present embodiment. In the vehicle 1 according to the present embodiment, the operation input signal Scr is output by, for example, an occupant in the vehicle 1 operating an operation switch provided in a vehicle cabin, a portable device, or the like. The ECU 40 according to the present embodiment is configured to control the operation of the movable panel 10 based on the operation input signal Scr.

More specifically, the ECU 40 according to the present embodiment includes a motor control unit 45 that generates a motor control signal, and a drive circuit 50 that supplies the driving electric power to the motor 30 based on the motor control signal output by the motor control unit 45. Further, in the actuator 31 according to the present embodiment, a direct current motor with a brush is adopted as the motor 30 serving as the drive source of the actuator 31. In the drive circuit 50 according to the present embodiment, a known PWM inverter is used in which a plurality of switching elements (field effect transistors (FETs)) that perform on and off operations based on the motor control signal are connected in a bridge shape.

Specifically, the drive circuit 50 according to the present embodiment includes a so-called H-bridge structure in which a first switching arm 61 including a pair of FETs 60a and 60b connected with each other in series and a second switching arm 62 including a pair of FETs 60c and 60d similarly connected with each other in series are connected in parallel in two rows. In the drive circuit 50, a power supply voltage Vb of a vehicle-mounted power supply 65 is applied to the FETs 60a, 60c on an upper-step side (upper side in FIG. 3) of the first and second switching arms 61, 62, and the FETs 60b, 60d on a lower-step side (lower side in FIG. 3) are grounded. A connection point 61x of the FETs 60a, 60b in the first switching arm 61 and a connection point 62x of the FETs 60c, 60d in the second switching arm 62 are connection points to the motor 30, that is, motor connection terminals.

That is, when the motor 30 is rotated in a first direction, the motor control unit 45 according to the present embodiment turns on the FET 60a on the upper-step side of the first switching arms 61 and turns off the FET 60b on the lower-step side of the first switching arm 61, and turns on the FET 60d on the lower-step side of the second switching arm 62 and turns off the FET 60c on the upper-step side of the second switching arm 62 according to the output of the motor control signal. When the motor 30 is rotated in a second direction, the motor control unit 45 turns on the FET 60c on the upper-step side of the second switching arms 62 and turns off the FET 60d on the lower-step side of the second switching arm 62, and turns on the FET 60b on the lower-step side of the first switching arm 61 and turns off the FET 60a on the upper-step side of the first switching arm 61 according to the output of the motor control signal. Further, the motor control unit 45 according to the present embodiment can change the driving force generated in the motor 30 by controlling an ON duty ratio of each of FETs 60a to 60d through the output of the motor control signal.

In addition, when the movable panel 10 being moved based on the driving force of the motor 30 is to be stopped, the motor control unit 45 according to the present embodiment generates the braking force in the motor 30 due to the execution of the brake control. Specifically, the motor control unit 45 executes regenerative brake control in which the FETs 60a, 60c on the upper-step side constituting the drive circuit 50 are turned on or the FETs 60b, 60d on the lower-step side constituting the drive circuit 50 are turned on. Accordingly, the sunroof device 11 according to the present embodiment can quickly stop the movable panel 10 being moved.

Further, when the drive control for generating the driving force in the motor 30 is shifted to the regenerative brake control, the motor control unit 45 according to the present embodiment sets a free running period of the movable panel 10 during which free rotation of the motor 30 is allowed by executing motor free control in which all of the FETs 60a to 60d constituting the drive circuit 50 are turned off. Accordingly, the sunroof device 11 according to the present embodiment is configured to prevent vibration and sound when the movable panel 10 is to be stopped.

Figure 4:
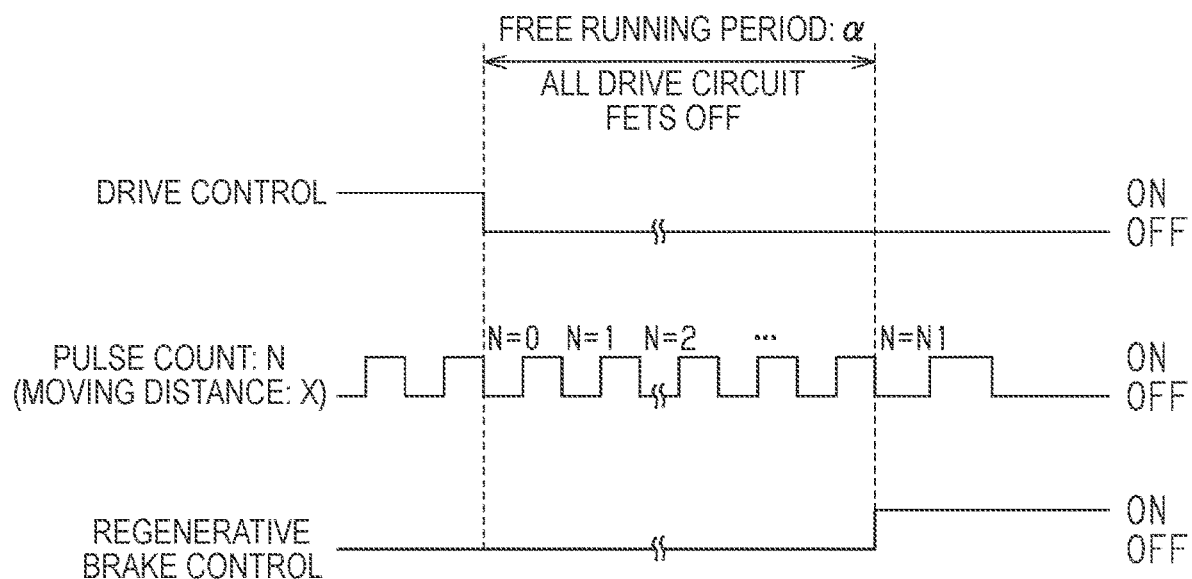
FIG. 4 is an explanatory diagram showing a free running period setting based on a moving distance of a movable panel after execution of drive control is stopped.

Specifically, as shown in FIG. 4, the motor control unit 45 according to the present embodiment measures a moving distance X of the movable panel 10 by counting edges of the pulse signal Sp synchronized with the rotation of the motor 30, that is, the operation of the movable panel 10, specifically, falling edges of the pulse signal Sp, after the execution of the drive control is stopped. A period until a count number N reaches a predetermined number N1 is set as the free running period α of the movable panel 10.

Figure 5:
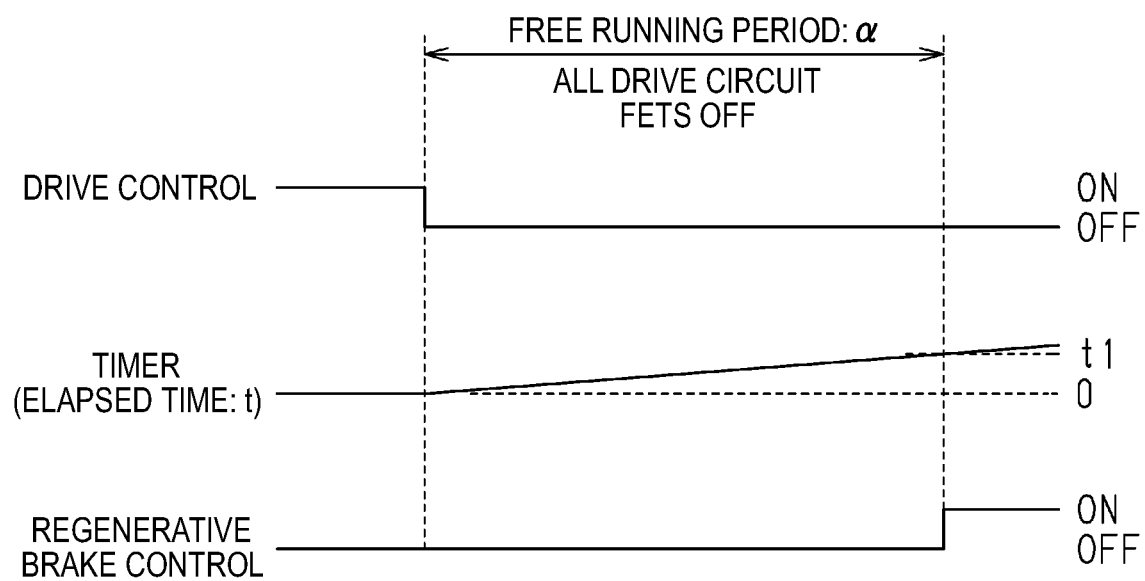
FIG. 5 is an explanatory diagram showing a free running period setting based on an elapsed time after the execution of the drive control is stopped.

As shown in FIG. 5, the motor control unit 45 according to the present embodiment measures an elapsed time t thereof after the execution of the drive control is stopped. A period until the elapsed time t reaches a predetermined time t1 is set as the free running period α of the movable panel 10.

That is, in the sunroof device 11 according to the present embodiment, the free running period α of the movable panel 10 is set based on the moving distance X of the movable panel 10 after the execution of the drive control for generating the driving force in the motor 30 is stopped and the elapsed time t after the execution of the drive control is stopped. After the free running period α elapses, the regenerative brake control is executed.

Figure 6:
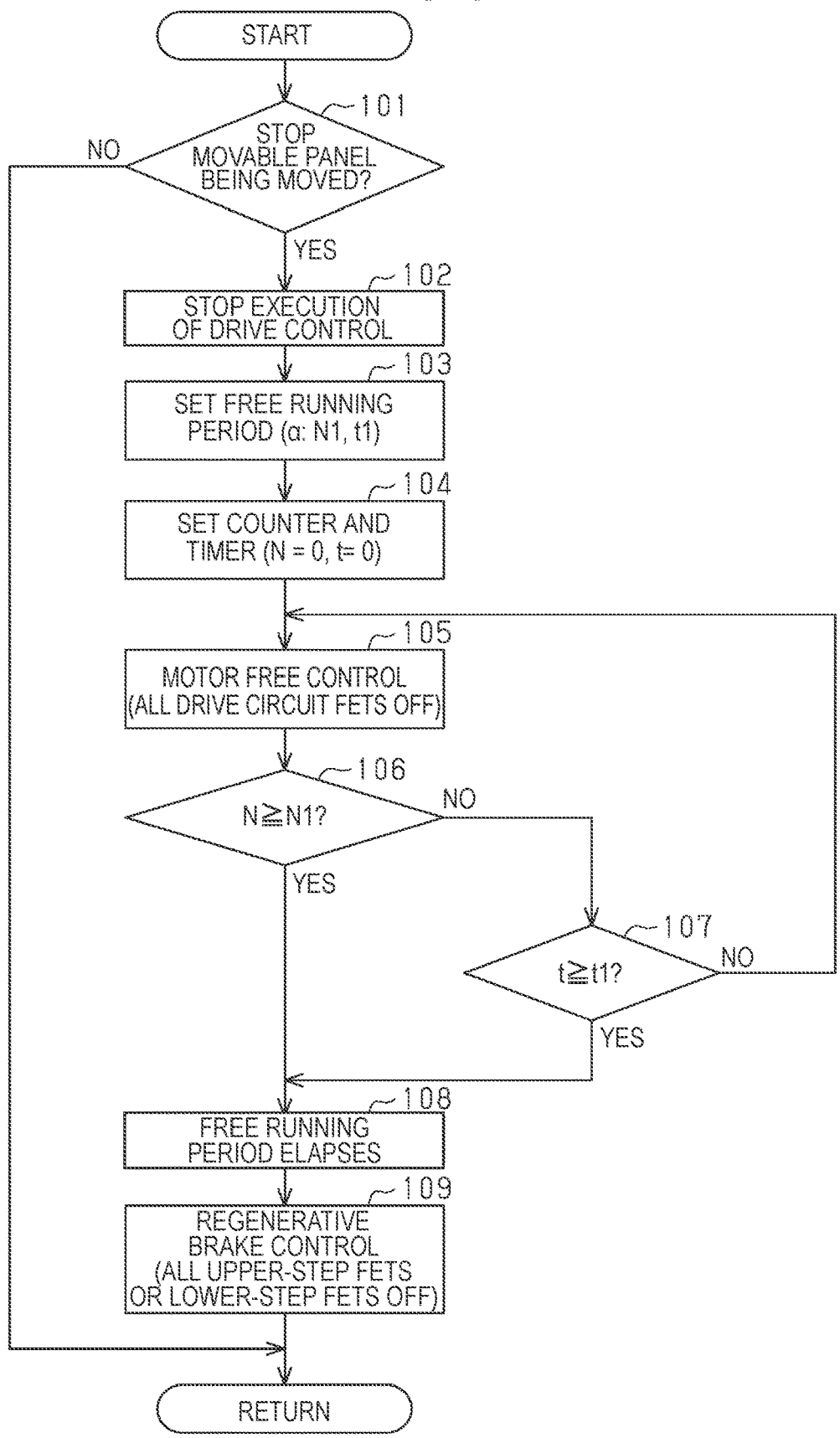
FIG. 6 is a flowchart showing a processing procedure of movable panel stop control.

That is, as shown in a flowchart in FIG. 6, when the movable panel 10 being moved based on the driving force of the motor 30 is to be stopped (step 101: YES), the motor control unit 45 according to the present embodiment first stops the execution of the drive control for generating the driving force of the movable panel 10 in the motor 30 (step 102). Next, the motor control unit 45 sets the free running period α after the execution of the drive control is stopped by reading the predetermined number N1 and the predetermined time t1 from a storage area (not shown) (step 103). Then, the motor control unit 45 sets a counter that measures a count number N of the pulse signal Sp and a timer that measures the elapsed time t after the execution of the drive control is stopped (N=0, t=0, step 104), and allows the free rotation of the motor 30 by the execution of the motor free control in which all the FETs 60a to 60d of the drive circuit 50 are turned off (step 105).

Further, the motor control unit 45 according to the present embodiment determines whether the count number N of the pulse signal Sp synchronized with the rotation of the motor 30, that is, synchronized with the operation of the movable panel 10 reaches the predetermined number N1 (step 106), and determines whether the elapsed time t reaches the predetermined time t1 (step 107). When the count number N is less than the predetermined number N1 (N<N1, step 106: NO) and the elapsed time t does not reach the predetermined time t1 (t<t1, step 107: NO), the motor free control in step 105 is executed again.

In addition, when the count number N reaches the predetermined number N1 in step 106 (N≥N1, step 106: YES), the motor control unit 45 according to the present embodiment determines that the free running period α elapses (step 108). Further, when the elapsed time t reaches the predetermined time t1 in step 107 (t t1, step 107: YES), the motor control unit 45 determines that the free running period α elapses in step 108. Then, the motor control unit 45 according to the present embodiment switches a control mode of the motor 30 to be executed to the regenerative brake control (step 109).

In the sunroof device 11 according to the present embodiment, the regenerative brake control is continued until the predetermined time set in advance elapses. Thus, the sunroof device 11 according to the present embodiment can reliably stop the movable panel 10.

Next, effects of the present embodiment will be described.

That is, when the drive control is shifted to the brake control, the loaded movement of the movable panel 10 caused by reversal of a load direction becomes gentle by setting the free running period α. Further, even in the free running period α, the moving speed of the movable panel 10 decreases based on sliding resistance. Thus, generation of vibration and sound associated with the execution of the regenerative brake control is prevented.

Next, effects of the present embodiment will be described.

(1) The ECU 40 serving as the opening-closing control unit controls the operation of the movable panel 10 serving as the opening-closing body provided in the roof opening portion 3 of the vehicle 1 by controlling the energization of the motor 30 serving as the drive source. Further, when the movable panel 10 being moved based on the driving force of the motor 30 is to be stopped, the ECU 40 sets the free running period α during which the free rotation of the motor 30 is allowed, and executes the brake control for generating the braking force in the motor 30 after the free running period α elapses.

According to the above configuration, the loaded movement generated in the movable panel 10 due to the execution of the brake control can be made gentle. Further, the moving speed of the movable panel 10 can be reduced based on the sliding resistance before the execution of the brake control. Accordingly, vibration and sound when the movable panel 10 is to be stopped can be prevented.

In particular, in many cases, the movable panel 10 of the sunroof device 11 has a structure that is more likely to keep moving due to inertia thereof even after the execution of the drive control is stopped, and is likely to generate vibration and sound due to the loaded movement due to the execution of the brake control. In addition, since the movable panel is provided at a position close to an occupant in the vehicle 1, enhancement of quietness thereof by adopting the above configuration can improve the ride quality.

(2) The ECU 40 sets the free running period α based on the moving distance X of the movable panel 10 after the execution of the drive control for generating the driving force in the motor 30 is stopped.

According to the above configuration, even when the rotation of the motor 30 is fast and the moving speed of the movable panel 10 is fast, it is possible to appropriately shift to the brake control after the elapse of the free running period α. Accordingly, the deviation of the stop position can be prevented.

(3) The ECU 40 sets the free running period α based on the elapsed time t after the execution of the drive control for generating the driving force in the motor 30 is stopped. Accordingly, even when the rotation of the motor 30 is slow and the moving speed of the movable panel 10 is slow, it is possible to appropriately shift to the brake control after the elapse of the free running period α.

(4) The ECU 40 executes the regenerative brake control after the free running period α elapses.

According to the above configuration, the braking force can be generated in the motor 30 while preventing the heat generation of the motor 30. There is an advantage that the brake control can be executed even when the motor 30 is a direct current motor with a brush.

The embodiment described above can be modified and implemented as follows. The embodiment above-described and the following modifications can be implemented in combination with each other as long as they do not have technical contradiction.

The embodiment described above is embodied as the sunroof device 11 in which the movable panel 10 provided in the roof opening portion 3 of the vehicle 1 serves as the opening-closing body. However, this disclosure is not limited thereto, and this disclosure may be applied to another opening-closing body control device for a vehicle such as a power sliding door device in which a sliding door or the like provided in a door opening portion of a vehicle is used as an opening-closing body. This disclosure is not limited to such an opening-closing control device for a vehicle, and may be applied to a motor control device that can be used for other applications.

In the above embodiment, a direct current motor with a brush is adopted as the motor 30 serving as the drive source of the actuator 31, but this disclosure may be applied to a configuration in which a brushless motor is used for the motor 30 of the actuator 31. In this case, the brake control is not limited to the regenerative brake control, and electromagnetic brake control by so-called phase-fixed energization in which an energized phase is fixed may be executed as the brake control.

For example, as shown in FIG. 7, the braking force generated in the motor 30 due to the execution of the brake control may be gradually increased by gradually increasing a duty D of the switching element to be turned on at the time of the execution of the brake control and the elapse of a time T. Accordingly, vibration and sound when the movable panel 10 is to be stopped can be more suitably prevented.

In the above embodiment, by counting the edges of the pulse signal Sp synchronized with the rotation of the motor 30, the moving distance X of the movable panel 10 after the execution of the drive control is stopped is measured. However, this disclosure is not limited thereto, and the pulse signal Sp used to measure the moving distance X may be synchronized with the operation of other members such as rotation of a reduction gear as long as the pulse signal Sp is synchronized with the operation of the movable panel 10. Further, the moving distance X of the movable panel 10 after the execution of the drive control is stopped may be measured by a method other than counting of the pulse signal Sp.

In the above embodiment, the free running period α of the movable panel 10 is set based on both the moving distance X of the movable panel 10 after the execution of the drive control is stopped and the elapsed time t after the execution of the drive control is stopped, but the free running period α may be set based on either the moving distance X or the elapsed time t.

An opening-closing body control device for a vehicle according to an aspect of this disclosure includes: an opening-closing control unit configured to control an operation of an opening-closing body provided in an opening portion of a vehicle by controlling energization of a motor serving as a drive source. When the opening-closing body being moved based on a driving force of the motor is to be stopped, the opening-closing control unit sets a free running period during which free rotation of the motor is allowed, and executes brake control for generating a braking force in the motor after the free running period elapses.

According to the above configuration, a loaded movement generated on the opening-closing body due to execution of the brake control can be made gentle. Further, a moving speed of the opening-closing body can be reduced based on sliding resistance before the execution of the brake control. Accordingly, vibration and sound when the opening-closing body is to be stopped can be prevented.

In the opening-closing body control device for a vehicle, it is preferable that the opening-closing control unit sets the free running period based on a moving distance of the opening-closing body after execution of drive control for generating the driving force in the motor is stopped.

According to the above configuration, even when the moving speed of the opening-closing body is high, it is possible to appropriately shift to the brake control after the free running period elapses. Accordingly, a deviation of a stop position can be prevented.

In the opening-closing body control device for a vehicle, it is preferable that the opening-closing control unit sets the free running period based on an elapsed time after execution of the drive control for generating the driving force in the motor is stopped.

According to the above configuration, even when the moving speed of the opening-closing body is slow, it is possible to appropriately shift to the brake control after the free running period elapses.

In the opening-closing body control device for a vehicle, it is preferable that the brake control is regenerative brake control.

According to the above configuration, the braking force can be generated in the motor while preventing heat generation of the motor. There is an advantage that the brake control can be executed even when the motor is a direct current motor with a brush.

In the opening-closing body control device for a vehicle, it is preferable that the opening-closing control unit gradually increases the braking force generated in the motor due to execution of the brake control.

According to the above configuration, vibration and sound when the opening-closing body is to be stopped can be more suitably prevented.

In the opening-closing body control device for a vehicle, it is preferable that the opening-closing body is a movable panel of a sunroof device.

That is, in many cases, the movable panel of the sunroof device has a structure that is more likely to keep moving due to inertia thereof even after the execution of the drive control is stopped, and is likely to generate vibration and sound due to the loaded movement due to the execution of the brake control. In addition, since the movable panel is provided at a position close to an occupant in the vehicle, enhancement of quietness thereof by setting the free running period can improve the ride quality.

According to this disclosure, it is possible to prevent vibration and sound when an opening-closing body is to be stopped.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. An opening-closing body control device for a vehicle, comprising:
    an opening-closing control unit configured to control an operation of an opening-closing body provided in an opening portion of a vehicle by controlling energization of a motor serving as a drive source, wherein
    the opening-closing unit receives, from a storage area, a free running period during which free rotation of the motor is allowed, and
    when the opening-closing body being moved based on a driving force of the motor is to be stopped, the opening-closing control unit sets the free running period received from the storage area, allows the free rotation of the motor while the free rotation of the motor is measured during the free running period, and executes brake control for generating a braking force in the motor after the free running period elapses.

2. The opening-closing body control device for a vehicle according to claim 1, wherein
    the opening-closing control unit sets the free running period based on a predetermined moving distance of the opening-closing body after execution of drive control for generating the driving force in the motor is stopped.

3. The opening-closing body control device for a vehicle according to claim 1, wherein
    the opening-closing control unit sets the free running period based on a predetermined elapsed time after execution of the drive control for generating the driving force in the motor is stopped.

4. The opening-closing body control device for a vehicle according to claim 1, wherein
    the brake control is regenerative brake control.

5. The opening-closing body control device for a vehicle according to claim 1, wherein
    the opening-closing control unit gradually increases the braking force generated in the motor due to execution of the brake control.

6. The opening-closing body control device for a vehicle according to claim 1, wherein
    the opening-closing body is a movable panel of a sunroof device.

7. The opening-closing body control device for a vehicle according to claim 2, wherein the opening-closing control unit sets the free running period based on a predetermined elapsed time after execution of the drive control for generating the driving force in the motor is stopped, and executes the brake control for generating a braking force in the motor when the predetermined elapsed time elapses before the predetermined movement distance.

8. The opening-closing body control device for a vehicle according to claim 1, further comprising a drive circuit that supplies driving electric power to the motor, wherein the driving circuit includes field effect transistors, and wherein the opening-closing control unit sets the free running period by executing motor free control in which all of the field effect transistors are turned off.

\* \* \* \* \*